US007007006B2

(12) United States Patent
Zilio et al.

(10) Patent No.: US 7,007,006 B2
(45) Date of Patent: Feb. 28, 2006

(54) METHOD FOR RECOMMENDING INDEXES AND MATERIALIZED VIEWS FOR A DATABASE WORKLOAD

(75) Inventors: Daniel C. Zilio, Toronto (CA); Gary G. Valentin, Toronto (CA); Guy M. Lohman, San Jose, CA (US); Calisto P. Zuzarte, Pickering (CA); Roberta J. Cochrane, Los Gatos, CA (US); Hamid Pirahesh, San Jose, CA (US); Markos Zaharioudakis, Los Gatos, CA (US); Kit Man Cheung, Willowdale (CA); Kevin S. Beyer, San Jose, CA (US); David E. Simmen, San Jose, CA (US); Ting Y. Leung, San Jose, CA (US); Samuel S. Lightstone, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 10/177,007

(22) Filed: Jun. 21, 2002

(65) Prior Publication Data

US 2003/0088541 A1    May 8, 2003

Related U.S. Application Data

(60) Provisional application No. 60/229,818, filed on Jun. 21, 2001.

(51) Int. Cl.
*G06F 17/30* (2006.01)
(52) U.S. Cl. ................................. 707/2; 707/4; 707/5
(58) Field of Classification Search .................. 707/2, 707/4, 5, 3
See application file for complete search history.

(56) References Cited

U.S. PATENT DOCUMENTS

| | | | | |
|---|---|---|---|---|
| 6,356,890 B1 * | 3/2002 | Agrawal et al. | ................ | 707/2 |
| 6,356,891 B1 * | 3/2002 | Agrawal et al. | ................ | 707/2 |
| 6,366,903 B1 * | 4/2002 | Agrawal et al. | ................ | 707/2 |
| 6,513,029 B1 * | 1/2003 | Agrawal et al. | ................ | 707/2 |

* cited by examiner

*Primary Examiner*—Hosain Alam
*Assistant Examiner*—CamLinh Nguyen
(74) *Attorney, Agent, or Firm*—Richard M. Goldman; Mark D. McSwain

(57) ABSTRACT

The invention herein provides method and apparatus, including software for determining a set of materialized views or indices of the contents or a subset of the contents of a database in a data processing system to be created for one or more users of the database. The method and apparatus provide method and means for evaluating a workload presented by a user to the database; evaluating the data processing system characteristics; evaluating the database characteristics; and, using the above evaluations for recommending a set of suitable materialized views or indices to the user. Another aspect of the invention, which may be used for a workload presented by a user of a database in a data processing system, provides method and apparatus, including software for determining a set of materialized views or indices of the contents or a subset of the contents of the database, by: generating a plurality of materialized view candidates from evaluation of the workload, data processing system characteristics and database characteristics; estimating statistics for the materialized view candidates such as the number of rows, row size, and column statistics; generating a plurality of potential index candidates by evaluating the workload, data processing system characteristics, database characteristics and the materialized view candidates; and, from the materialized view candidates and index candidates selecting a set of suitable materialized views and/or indices for submission to the user.

14 Claims, 2 Drawing Sheets

US 7,007,006 B2

METHOD FOR RECOMMENDING INDEXES AND MATERIALIZED VIEWS FOR A DATABASE WORKLOAD

This application claim the benefit of 60/229,818 filed Jun. 21, 2001.

FIELD OF THE INVENTION

The invention relates to the field of data processing, and more particularly to the field of data base performance tuning for improving workload performance.

BACKGROUND OF THE INVENTION

Deciding which materialized views (MVs) and indexes should be created that will likely result in good performance for a user's database workload is an exponentially complex problem with respect to the number of queries, the number of tables, the number of updates, and the number of columns on the tables. Having some automated method that analyzes the workload and uses information about the system configuration and the database characteristics will allow the user to answer the problem. If the method is efficient, the user will be able to derive a good set of materialized views and indexes with low cost.

SUMMARY OF THE INVENTION

The invention herein provides method and apparatus, including software for determining a set of materialized views or indices of the contents or a subset of the contents of a database in a data processing system to be created for one or more users of the database.

The method and apparatus provide method and means for evaluating a workload presented by a user to the database; evaluating the data processing system characteristics; evaluating the database characteristics; and, using the above evaluations for recommending a set of suitable materialized views or indices to the user.

Another aspect of the invention, which may be used for a workload presented by a user of a database in a data processing system, provides method and apparatus, including software for determining a set of materialized views or indices of the contents or a subset of the contents of the database, by:

generating a plurality of materialized view candidates from evaluation of the workload, data processing system characteristics and database characteristics;

estimating statistics for the materialized view candidates such as the number of rows, row size, and column statistics;

generating a plurality of potential index candidates by evaluating the workload, data processing system characteristics, database characteristics and the materialized view candidates; and, from the materialized view candidates and index candidates selecting a set of suitable materialized views and/or indices for submission to the user.

DESCRIPTION OF A PREFERRED EMBODIMENT OF THE INVENTION

Deciding which materialized views (MVs) and indexes should be created that will likely result in good performance for a user's database workload is an exponentially complex problem with respect to the number of queries, the number of tables, the number of updates, and the number of columns on the tables. Having some automatic algorithm that analyzes the workload and uses information about the system configuration and the database characteristics will allow the user to answer the problem. If the algorithm is efficient, the user will be able to derive a good set of materialized views and indexes with low cost.

This invention describes such an automatic method. It should be noted that candidate MVs and indexes are chosen for base tables and existing MVs. Also, the candidates are all derived from the user's workload. A time constraint is used to limit how long the algorithm will take to produce a result so that the algorithm can determine MV and index recommendations before and during a database's use.

The invention also can use a multi-query optimization (MQO) process to compile workload queries together to find common query components among queries. These components are potential good MV candidates. This invention's algorithm saves these possible candidates as input to a selection method.

The index candidates are derived from a special optimization process [6], where virtual indexes are created when the optimizer determines they would be useful in query plans.

The candidates are then input into a combinatorial selection algorithm that takes their performance benefits and space constraints into account, so that indexes and MVs are chosen together in the same algorithm. This invention extends the selection algorithm defined in [6] to obtain MV candidates using the MQO work in [5]. The selection algorithm includes an initial combinatorial algorithm (called the knapsack algorithm). Since the knapsack algorithm does not guarantee an optimal solution, the selection has an added random swapping phase that will iteratively trade MV's and indexes in a solution to ones not in the solution, but only if the swap results in a new solution with better performance that the original. This combined selection results in an algorithm that finds solutions for MV's beyond the solutions found by the algorithms defined in [2,4]. Also, the addition of indexes and MVs in this invention's selection is a differentiator with the work in [2,4].

The invention describes an algorithm for selecting either MVs only, indexes only, or both.

The benefits and differences of using the invention over existing MV algorithm inventions are as follows:

One aspect of the invention generates MV candidates using the multi-query optimization (MQO) work in [5]. Another technique in [4] attempts to find common subqueries, which has some similar goals to the MQO method. However, this other technique does not include the concept of matching similar subparts of queries and adding compensation in queries for using the subparts. The present invention identifies more common subexpressions and common subsumers, and thus it more MV candidates that directly relate to the workload. The MQO method also prunes useless MV candidates; other methods do not prune, and thus may lead to a lot of useless MVs being analyzed.

Another aspect of the present invention combines index and MV selection. The invention can use the index candidate generation described in [6]. Previous methods either do not consider index selection as being integrated with MV selection or disclose exponentially complex algorithms, e.g, [1,2,3,4,8]. Microsoft in [7] discloses a non-exponential algorithm that is different to this invention's. They determine single column indexes and single table MVs first and then build multi-table MVs and multi-column indexes one table and column (respectively) at a time using an iterative approach. A beneficial aspect of the MQO method of the present invention will directly find multicolumn MVs from one compilation of the workload.

Another aspect of the present invention also defines a cost/benefit metric to rank MVs and indexes together. The metric combines how much benefit candidates each give to the workload and how much space they use so that the selection algorithm can determine the set of candidates that would provide good workload performance with minimal storage used.

Another aspect of the present invention allows for different types of MVs. Refresh deferred MVs (that are updated manually by the user) and refresh immediate MVs (that update the MVs immediately when its base tables are changed) are included in these types. This invention also defines a cost/benefit metric to rank MVs and indexes together. The metric combines how much benefit candidates each give to the workload and how much space they use so that the selection algorithm can determine the set of candidates that would provide good workload performance with minimal storage used.

Another aspect of the present invention uses the constraints in [6] to permit the user to limit disk space used by new indexes and MVs and to limit the amount of time the selection algorithm will take to execute (which will be useful when DBAs have only a narrow batch window to run this tool). Other constraints could also be used in executing this algorithm. These include constraints such as limiting the total number of candidates chosen or limiting the number of candidates chosen per table. These constraints can be handled by having a counter for the number of candidates and/or the number per table. When a counter reaches its maximum, no more candidates are allowed to be selected in the solution for either all tables or a single table. A constraint to limit which tables can have candidate MVs and indexes defined on them is allowed as well. The algorithm would merely reject candidates defined on other tables.

Another aspect of the present invention deals with a large number of queries and execution memory constraints (limiting how much memory the algorithm's execution can use) by grouping workload queries and generating MV candidates for each group separately. Groups are constructed so that each group when compiled together using our MQO method will not exceed the execution memory constraint. This invention describes how to group similar queries together so that each group will provide meaningful candidates from the MQO method. Other existing methods, such as the one in [4], do not take execution memory constraints into account.

Another aspect of the present invention considers constructing materialized view candidates from other MV candidates, for example, by using the common subsumer work in [5], whereas other methods only consider MVs on base tables or existing views (e.g., [4])

Update, insert, and delete transactions are allowed in the workload to account for the penalty of adding too many MVs and indexes.

Statistics can be generated automatically (for example using an optimizer's cost model). However, it also allows the collection of statistics on candidate MVs to be done using sampling. Other methods just use estimated statistics. Sampling provides more accurate estimates with which to rank MVs.

A local DB catalog simulation can be used when executing the algorithm so that other users are unaffected by its execution. A simulation is described in [9].

The present invention can be used to determine replicas of a table (or replicas of a table's subset) in a multiprocessor system (MPP). This is allowed since a replica of a base table can be defined as a MV, which could be partitioned independently to the base table and/or other replicas of the base table.

The present invention can also be used to recommend index and MV candidates in a heterogeneous distributed DB system (HDDBS). Heterogeneous DB systems are systems in which different hardware architectures are connected by a network possibly running DB systems from different vendors. In the preferred embodiment, one of the DB systems is considered as the local DB system in which all the DB's in the HDDBS have their data structure objects logically defined in the local DB system's database. The local DB system can compile queries defined with DB data structure objects throughout the HDDBS. MVs and indexes can then be recommended on the local DB system using the invention, where these recommendations are for local and remote DB systems.

Before describing the invention, its required inputs are now described. There are three sets of inputs:

A set of workload queries. The invention makes recommendations based on a workload, which consists of a set of SQL statements and their individual frequencies of use. The preferred embodiment of the invention uses a default frequency is one.

System information. This includes the number of nodes; the bandwidth of interconnect network; the latency, transfer rate, and seek times of the disk drives; and the estimated processing power of the processors.

The Database (DB) characteristics. This information includes the relational schema, the cardinalities of tables, the column cardinalities, and possibly other physical DB design characteristics (such as indexes, partitioning, and already chosen views and materialized views). For example, in DB2, the system and DB information will come from the DB2 configuration and catalog information.

Depending on the user's requirement, the invention allows for three types of output: the recommended MVs, the recommended indexes, or both.

DETAILED DESCRIPTION OF THE INVENTION

Figure 1:
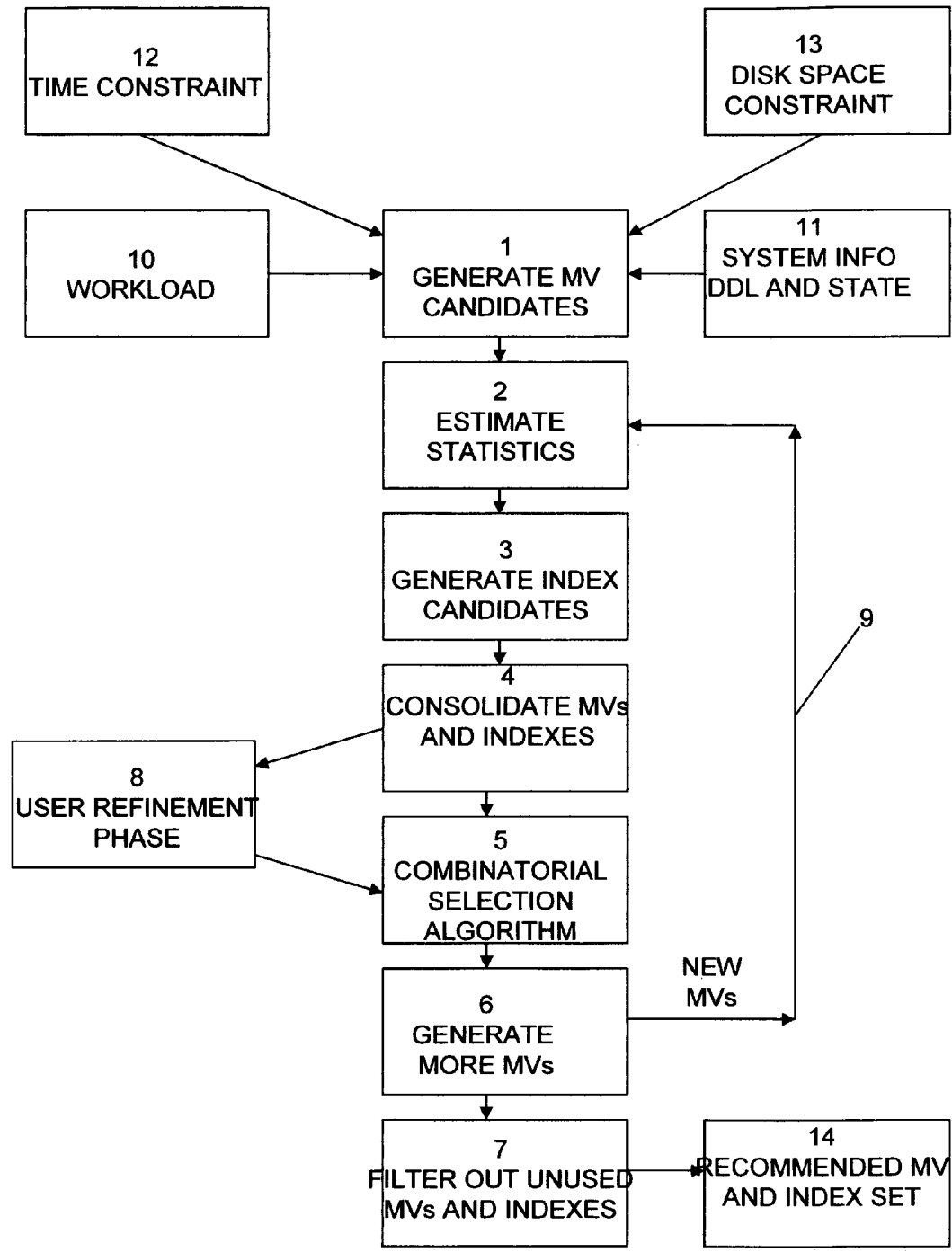
FIG. 1 depicts a flow chart of a method of one embodiment of the invention.

Referring to FIG. 1 with workload 10, system and database information 11, as input, the invention generates a set of materialized view candidates, 1, and then estimates statistics for the materialized views, 2. Using the estimated statistics and the materialized view candidates along with workload, 10, system and database information, 11, the invention generates index candidates, 3.

Figure 2:
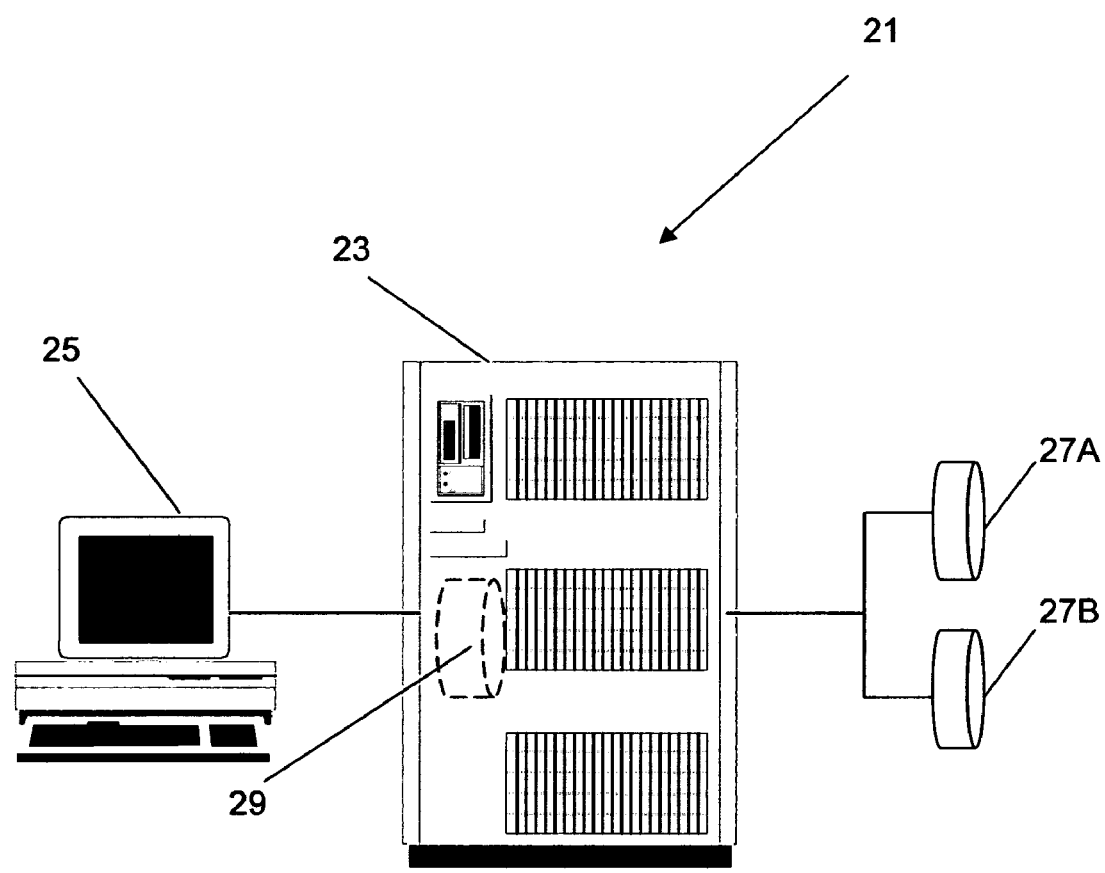
FIG. 2 depicts a system, including a processor, a terminal, and memory, in which the method and article of the invention may be implemented.

Referring to FIG. 2, there is shown a system 21 including a processor 23 with a terminal 25 and external memory, as drives 27A and 27B for carrying database management system data files. The processor 23 includes one or more drives 29 for system software and application software, including database management system software.

The set of materialized new candidates and index candidates obtained above are consolidated by the invention into a consolidated set of materialized views and indices, 4.

Next, the invention executes a selection algorithm, 5, described below, to determine an intermediate set of data structure objects (indices and materialized views). The invention can generate more candidate data structure objects, 6, for example, by constructing supersets or subsets of the current MVs. This new set would then be the new candidate set that is fed back, 9, into the estimating statistics phase, 2. The invention iterates until it either exceeds algorithm execution time constraint, 12, or it cannot add any more new MVs without exceeding disk space constraint, 13.

Since in the preferred embodiment, the invention executes on a local DB system to determine recommended MVs and/or indices, 14, for a heterogeneous distributed DB system (HDDBS), a last "filtering" step,7, should be carried out on the remote DB systems to guarantee that the recommended MVs and indices will be used by the remote systems' compilers. If a recommended MV or index is not used at all to execute the workload at the remote DB system to which it is recommended for, the invention would eliminate the recommended object.

The invention can be executed in two ways. In the first way, the invention initially obtains the MV and index candidates and their estimated statistics in a phase called the CANDIDATE phase (steps 1, 2, 3, 4). Candidates are stored in special ADVISE tables. In FIG. 1, the steps in the CANDIDATE phase are the steps up to and including the Consolidating MVs and Indexes steps. The invention then executes the SEARCH phase (steps 5, 6, 7, 9). This phase causes the combinatorial selection algorithm to be invoked using the candidates in the ADVISE tables. The SEARCH phase includes all steps under and including the combinatorial algorithm.

The other way to execute invention is to execute the CANDIDATE and SEARCH phases separately. The CANDIDATE phase is done initially. The invention then executes a REFINEMENT phase, 8, in which a user can change, add, or drop MVs and indexes in the ADVISE tables. The user can change the statistics in the ADVISE tables either manually or through the use of sampling the real database. The REFINEMENT phase is shown in FIG. 1 with dotted lines for executions where the phases are to be run in two different invention invocations. When the user refinement phase is complete, the invention executes the SEARCH phase.

Note that if indexes are to be chosen alone, the Generate MV Candidate, Estimating Statistics (for MVs), and the Generate more MVs modules will not be executed. If only MVs are to be selected, the Generate Index Candidates module will not be executed. When selecting both indexes and MVs, all modules will be executed unless the user does not specify that REFINEMENT is required.

DETAILED DESCRIPTION OF A PREFERRED EMBODIMENT OF THE INVENTION

3. Module Descriptions 3.1 Generate Materialized View Candidates

This module is used to generate MV candidates for the given workload of queries. These candidates will be the set of MVs used by some combinatorial selection algorithm as input to determine which subset gives the best performance benefits. The candidates are temporarily recorded in the ADVISE table.

Generating candidates can be done using various approaches, such as:

Use the queries supplied in the workload as candidates.

For each query, determine if it can be the query defining an MV and thus be an MV candidate. For example, the simplest case is to define the query itself as possible candidate:

CREATE SUMMARY TABLE <name> AS <query>

Use the views defined by the user as the candidate MVs.

Utilize a MQO (Multi-Query Optimization) method to suggest candidates. We use the MQO method defined in [5].

Note that the multi-query optimization of all queries in a workload may cause MQO to use more space than is available. The invention handles this by adding information in the compiler that will tell us the memory space required to store the constructs of each query in the workload. MVs are grouped into sets such that the sum of each group's space is some factor (F) of the total execution memory space allowed for use by the MQO compiler phase. This execution memory constraint is given as part of the system information. Extra memory space is accounted for the space used by MQO to generate new MV candidates. Each group is compiled together using the MQO method. The grouping can be done in many ways, for example: 1) arbitrary grouping based only on the maximum space allowed per group (which is determined as a fraction F of the total space used for MQO) or 2) put MVs that are related (e.g., operate on similar tables/columns) somehow into the same groups. The invention describes a method below to handle #2, where the MVs will be grouped depending on the tables they access. This method is as follows:

a) Steps to create all queries as MVs in the workload:

```
i = 0
for each query in the workload
{
    get the current time
    Obtain the tables used in the query for the query (e.g., using DB2 EXPLAIN)
    Obtain the space used to represent the query
    Determine the tables that the query used by doing the following
        Create a linked list structure
            struct tabname { CHAR* TABLE_SCHEMA, CHAR*
TABLE_NAME , int tabnum, struct tabname *next}
            where each table is assigned a unique number by this algorithm.
        Also allocate an array of size equal to the number of queries where each
        element is the amount of space used for the query and a list of tablenums per query
        (call this array                     QUERYTAB)
    i++
}
```

Get the total memory space available for MQO

Determine the memory space per group of queries that can fit in that total space GROUPmax==TotalSPace*F If the sum of the space used by all queries<=GROUPmax, then compile all queries as one group using MQO OTHERWISE do the following:

```
{
    In QUERYTAB, we mark each query as not being compiled in MQO yet (e.g.,
set a flag in QUERYTAB as REFRESHFLAG =           false)
    Then do the following:
    num_refreshed_queries = 0
    start = true
    while num_refreshed_queries < number of queries in the workload
    {
        If start == true then
        {
            Find the first uncompiled query in QUERYTAB, and set GROUPcount =
            space for the query from QUERYTAB
                Set the query's refreshflag = true
            start = false
        }
```

Go through QUERYTAB and find the query that has the greatest intersection in the tabnum lists to the query first (or all current queries) picked for the group (or possibly find a query that has the closet query structure to queries in the group). The preferred embodiment is to use the intersection of tables accessed between queries.

```
        if( GROUPcount + size of new query > GROUPmax )
        {
            /* Execution memory space for the current group and the current query exceed
            the
                execution memory constraints, so compile the current group
            only, and
                save the current query to create a new group.
            */
            if we found >= 2 queries in the iteration then execute MQO with the current group
            (and set all queries with the refreshflag = true)
            Set start = true
            Continue grouping using the current query
        }
        Otherwise: set GROUPcount += space for new query and set the new query's refresh flag
        to TRUE
            Add one to the num_refreshed_queries
    }
        compile the last group if start = FALSE
}
```

The preferred embodiment uses all the above methods to generate candidates.

3.2 Generate Index Candidates

The invention generates index candidates using the method described in [6]. When selecting indexes and MVs together, the candidate MVs from step 3.1 are set to appear as though they exist in the database before generating candidate indexes. Thus, indexes are recommended for base tables, existing MVs and candidate MVs.

In the preferred embodiment, after generating candidate MVs and indexes, as a sanity check, the invention compiles the queries with all candidate and real MVs and indexes to determine if any query in the workload would exploit each MV or index. If a MV or index is not used by any query, the invention removes it from the candidate list, as it will never be chosen. The remaining MVs and indexes will make up the candidate set for next module.

3.3 Simulated Catalogs

Since the MV and index candidates do not exist in the database, the compiler would not be aware it could use the candidates in compiling workload queries. Thus, the invention includes a method by which the candidates can be added to the existing DB information, which allows the compiler to compile queries with existing and candidate MVs and indexes. The preferred embodiment does not rely on creating the candidate data structure objects as real data structure objects in the database because this would allow concurrent access and modifications on these nonexistent candidates by other users. To handle this problem, the invention creates a simulation of the database seen only by the invention, which it modifies with the candidate information. This method is described in [9]. In this simulation, a candidate's DDL only affects the simulated catalog information.

3.4 Statistics Associated with MVs

There are many ways of obtaining estimated statistics for the candidates. The preferred embodiment of the invention uses two methods. One method is to use the statistics generated by the optimizer. For a MV, the statistics are generated from the optimizer for the query representing the MV. Example of statistics generated include the estimated MV cardinality, the npages (calculated by using the rowsize, cardinality, and pagesize), and the column cardinalities.

Another method is to use sampling. To estimate a candidate MV's statistics, the query defining a candidate MV could be encapsulated by another SQL statement to collect samples from the existing base tables and MVs. For example, if the query defining an MV is:

SELECT a as c1, count(b) as c2 FROM R, S WHERE R.d=S.d GROUP BY a then the encapsulated query could be:

SELECT count(*) as rowcount, count(distinct c1) as c1 count, count(distinct c2) as c2 count FROM (SELECT a as c1, count(b) as c2 FROM R, S WHERE R.d=S.d GROUP BY a) as Q 3.5 Calculate Weight for MVs and Indexes As stated earlier, candidate data structure objects are ranked against each other to determine which candidates are more important than others. The ranking of a MV A in the invention is defined by the weight W(A) that is a measure of the MV's performance benefit (defined partly as B(w,A)) divided by disk space it will occupy (defined as D(A)). A high weight would suggest that the MV provides high performance benefit for little disk space cost. The weight of an index is defined similarly in [6]. Note that the overhead to updates will be reflected in the performance change and thus in the weight calculation. The MVs not used by any query would have weight 0.

The benefit B(w,A) of a MV A for a workload w is defined as:

$$B(w,A)=\Sigma Fi(P\text{without } A(Qi)-P\text{with } A(Qi))/\Sigma Fi,$$

where Fi is the frequency of query or update i, (Pwithout A(Qi)–Pwith A(Qi)) is the performance increase of having MV A compared to not having A for query or update i. Basically, the benefit of an MV A is the average performance improvement of having an MV over not having it. A negative value denotes a MV that is harmful to performance.

The preferred embodiment is to use a query's or update's total estimated time as the performance measure.

The weight depends on what the MV type is. If the MV type is refresh immediate, the weight of MV A is:

$$W(A)=B(w,A)/D(A).$$

If the type is refresh deferred, the weight of MV A is:

$$W(A)=(B(w,A)-g*C(A))/D(A),$$

where C(A) is the cost to create the MV A and represents the cost to refresh the whole MV A from scratch. We assume that we have "g" refresh per time period that we are interested in, and g>0. The preferred embodiment assumes a MV must be refreshed once during the interval the invention is interested in, so it uses "g=1".

3.6 Determine a Good Set of MVs for Materializing

In the invention, the selection algorithm sifts through the candidates suggested in the above modules. This algorithm's goal is to choose a subset of the candidates that lead to good workload performance while meeting certain constraints, e.g., disk space limitations. The core algorithm for this step is an algorithm that solves the Knapsack problem, which is to choose a set of items to fit within a fixed space such that the benefit of having the items you have chosen is optimized. Weightings defined in 3.5 are used to rank candidates in the knapsack algorithm.

The invention assumes the workload contains queries and updates. For index and MV selection, updates potentially perform more poorly when more MVs and indexes must be introduced. Queries perform better when more indexes and MVs are introduced. The calculation of costs of the updates and benefits of the queries when adding MVs is included as part of the search algorithm.

For MV selection only, the algorithm starts with the empty list of candidates, and, in each iteration, it adds the MV with the highest weight to the list until that MV causes the selected MVs to exceed the disk constraint. This algorithm is called the ADD_MV algorithm, and is given below.

```
/*
    ADD_MV - selects a set of candidate MVs only
    Input: A — a set of candidate MVs
            space — the amount of space available for pre-computation
    Output: S — the set of MVs to be materialized
*/
Algorithm ADD_MV
for each MV a, calculate its weight W(a)
re-order the MVs by weight in descending order and put in set A
S = { }
WHILE (space > 0 && A is not empty) DO
    pick a from A such that a has the highest weight
    IF W(a) <= 0 THEN
        /* No more MVs should be picked since they have no performance benefit */
        space = 0
    ELSE IF (space - | a | ) >= 0) THEN
        /* There is space for the next best MV a, so add it to the solution set S */
        space = space - | a |
        S = S ∪ a
        A = A - a
    END IF
END WHILE
RETURN S as the set of MVs picked by ADD_MV
```

The time complexity of ADD_MV is O(nlogn), where n is the number of candidate MVs. This complexity arises from the cost of sorting the candidate MVs by the weights calculated in section 3.5. Note that we continue to check when the time constraint is exceeded and stop the invention when it is. The best solution when the invention is stopped is picked as the recommended set.

The selection algorithm uses an added random swap method after the knapsack algorithm. This method exists to get around the selection of suboptimal solutions by the knapsack algorithm. The knapsack algorithm is used because it provides a good initial solution. There are three reasons the knapsack algorithm returns suboptimal results. First, the performance benefit for a query Q is assigned to all candidate indexes and MVs used by the query. This does not account for how much each candidate itself contributed to the performance improvement. As such, the benefit assigned to the candidates are optimistic. Second, the weighting of competing candidates is calculated independently. There is no concept of weighting an MV A, say, given that another MV B was not selected. Third, the ordering of some cost/benefit weightings to select a solution by the general knapsack algorithm provides a solution to a relaxed integral problem, but is known in the literature to not always lead to the optimal solution for the non-integral problem.

The random swap phase takes a random number of MVs from the current solution and replaces it with a random number of MVs not in the current solution. This causes a new solution to be generated. The invention executes this phase for either a user specified time limit or until the swapping cannot improve the workload performance (over a given number of consecutive swaps). This swapping phase is a useful amendment for the possibility of missing good MVs that we may have pruned off earlier.

To combine index and MV recommendations together, it should be noted that candidate indexes created on top of candidate MVs will have dependencies on the candidate MVs. The dependency has to be recorded before entering the selection algorithm.

The invention also includes an algorithm, ADD_COMBINE, for selecting a set of candidate data structure objects (MVs or indexes). This algorithm starts with the empty list of candidates. It repeats the following iteration until we exceed the disk constraint. On each iteration, it attempts to add the next object(s) with the highest weight(s) to the list. If the highest weighted object is an index that is dependent on a candidate MV and the MV has not been selected, the iteration must add both the index and MV to the list if they fit within the disk space. If they cannot fit, then the algorithm ignores the index and proceeds to the next highest weighted object.

```
/*
    ADD_COMBINE - selects a set of candidate data structure objects (MVs or indexes)
    Input: A — a set of candidate data structure objects (MVs or indexes)
          space — the amount of space available for pre-computation
    Output: S — the set of data structure objects to be recommended
*/
Algorithm ADD_COMBINE
for each object o (MV or index), calculate its weight W(o)
re-order the data structure objects by weight and put in set A
S = { }
WHILE (space > 0 && A is not empty) DO
     pick object o from A S.T. o has the highest weight
     IF W(o) <= 0 THEN
          space = 0
     ELSE
          C = { o }
          IF (o is an index on MV a in A) && (a ∉ S) THEN
               /* Add in the MV a since it is not in the solution yet and has to be there for
the index to be chosen */
               C = C ∪ a
          END IF
          IF (space - | C | ) >= 0) THEN
               /* There is space for the data structure objects in C, so add
               them to the solution. */
               space = space - | C |
               S = S ∪ C
                  A = A - C
          END IF
     END IF
END WHILE
RETURN S as the set of data structure objects picked by ADD_COMBINE
```

The random swap phase for this combined selection algorithm needs more considerations when we swap data structure objects. The data structure objects being swapped can be MVs and/or indexes. If an index is swapped into the solution, the swapping has to add in the candidate MV on which the index depends. For similar reasons, if a MV is swapped out of the solution, the indexes that depend on it have to be swapped out.

Here is an example of the random swap phase:

The RANDOM SWAP PHASE incorporates an adaptation of the Random-based bin-packing algorithm.

1. This phase is only required if some of the recommendations were discarded by the Knapsack selection, this would have happened because of negative benefits or missed constraints.

2. The set of recommendations discarded by the Knapsack selection is referred to as the "loser set". The preserved recommendations are referred to as the "winner set".

3. Randomly select a subset of the recommendations in the winner set, and randomly select a subset of the recommendations in the loser set.

4. Swap the two subsets so the losers become part of the winner set and vice-versa.

5. If the new solution set violates any of the user constraints, go back to step 1 and try again.

6. Using the optimizer, evaluate the new solution set.

If the new solution set is better than the best one so far with respect to estimated performance, keep it.

7. Go back to step 3 and try a new variation. The algorithm may choose to quit if certain criteria are met. For example, time has elapsed, or the best solution set has not been improved on over some time period.

REFERENCES

References on materialized view selection:
[1] Informix's materialized view selection. WO99/50762. (Title: Processing Precomputed Views, by Latha Colby et al.)
[2] Amit Shukla, Prasad M. Deshpande, Jeffrey F. Naughton, "Materialized view selection for multidimensional datasets", VlDB 1998, New York.
[3] (Oracle Patent) "Summary table management in a computer system", Andrew P. Osborn et al. (Appl # 962029, U.S. Pat. No. 6,023,695)
[4] Hoshi Mistry, Prasan Roy, S. Sudarshan, Krithi Ramamritham: Materialized View Selection and Maintenance Using Multi-Query Optimization. SIGMOD 2001
[5] (IBM) Roberta Cochrane et al, MQO in SIGMOD 2000)
[6] (IBM) Gary Valentin's and Guy Lohman's Index Invention U.S. Pat. No. 2,249,096
[7] Agrawal S., Chaudhuri, S., Narasayya V., "Automated Selection of Materialized Views and Indexes for SQL Databases" Proc. of the 26th VLDB Conference Cairo, Egypt, 2000
[8] Himanshu Gupta, Venky Harinarayan, Anand Rajaraman, Jeffrey D. Ullman: Index Selection for OLAP. ICDE 1997: 208–219
[9] (IBM) Walid Rjaibi's et al, Simulation Catalog patent application No. 2,283,052

The embodiments of the invention in which an exclusive property or privilege is claimed are defined as follows:

1. A computer implemented method of determining candidate indexes and candidate materialized views for a database system in a computer comprising the steps of:
    a) receiving workload information, system information, and database information, as input,
    b) generating a set of materialized view candidates, and index candidates;
    c) consolidating the materialized view candidates and index candidates into a consolidated set of materialized views and indices,
    d) weighting the materialized view candidates and index candidates by a measure of performance benefit of the materialized view candidates or index candidates divided by disk space required by the said materialized view candidates or index candidates; and
    e) selecting a set of candidate indexes and candidate materialized views by starting with an empty list of candidate materialized views and indexes, and successively adding a next index or materialized view with the highest weight to the list to thereby generate an ordered list of candidate materialized views and candidate indexes.

2. The method of claim 1 including refining the set of data structure objects to assist in optimizing the set of data structure objects.

3. The method of claim 2 including filtering out unnecessary materialized views and indices.

4. The method of claim 3 including recommending a set of suitable data structure objects to the user.

5. The method of claim 1 wherein generating a plurality of materialized view candidates comprises using common subexpressions and subsumers, present in the workload, identified by multiquery optimization.

6. A data processing system including a database management system, and having a system and software for determining candidate indexes and candidate materialized views for a database system by a method comprising the steps of:
    a) said database system receiving workload information, system information, and database information, as input,
    b) said database system generating a set of materialized view candidates, and index candidates;
    c) said database system consolidating the materialized view candidates and index candidates into a consolidated set of materialized views and indices,
    d) said database system weighting the materialized view candidates and index candidates by a measure of performance benefit of the materialized view candidates or index candidates divided by disk space required by the said materialized view candidates or index candidates; and
    e) said database system selecting a set of candidate indexes and candidate materialized views by starting with an empty list of candidate materialized views and indexes, and successively adding a next index or materialized view with the highest weight to the list to thereby generate an ordered list of candidate materialized views and candidate indexes.

7. The system of claim 6 including means for refining the set of data structure objects to assist in optimizing the set of data structure objects.

8. The system of claim 7 including means for filtering out unnecessary materialized views and indices.

9. The system of claim 8 including means for recommending a set of suitable data structure objects to the user.

10. The system of claim 6 wherein said means for generating a plurality of materialized view candidates uses common subexpressions and subsumers, present in the workload, identified by multiquery optimization.

11. An article comprising: a computer-readable data storage medium; means recorded on the medium for controlling a computer to determine candidate indexes and candidate materialized views for a database system by a method comprising the steps of:
    a) receiving workload information, system information, and database information, as input,
    b) generating a set of materialized view candidates, and index candidates;
    c) consolidating the materialized view candidates and index candidates into a consolidated set of materialized views and indices,
    d) weighting the materialized view candidates and index candidates by a measure of performance benefit of the materialized view candidates or index candidates divided by disk space required by the said materialized view candidates or index candidates; and
    e) selecting a set of candidate indexes and candidate materialized views by starting with an empty list of candidate materialized views and indexes, and successively adding a next index or materialized view with the highest weight to the list to thereby generate an ordered list of candidate materialized views and candidate indexes.

12. The article of claim 11, wherein the medium is a recordable data storage medium.

13. The article of claim 12 wherein the medium is selected from the group consisting of magnetic, optical, biological and atomic data storage media.

14. The article of claim 11 wherein said means recorded on the medium for generating a plurality of materialized view candidates uses common subexpressions and subsumers, present in the workload, identified by multiquery optimization.

* * * * *